H. R. SETZ.
PIPE COUPLING.
APPLICATION FILED MAR. 24, 1913.
1,087,559.
Patented Feb. 17, 1914.
Fig. I.
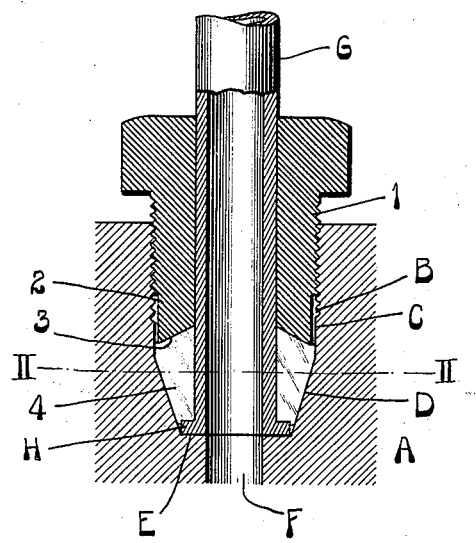
Fig. II.
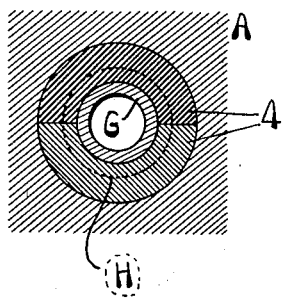
Attest
a. J. McCauley
E. B. Finn.
Inventor:
H. R. Setz
by Knight & Cook
Attys.

UNITED STATES PATENT OFFICE.

HANS R. SETZ, OF ST. LOUIS, MISSOURI, ASSIGNOR TO FULTON IRON WORKS, OF ST. LOUIS, MISSOURI, A CORPORATION.

PIPE-COUPLING.

1,087,559.  Specification of Letters Patent.  Patented Feb. 17, 1914.

Application filed March 24, 1913. Serial No. 756,437.

*To all whom it may concern:*

Be it known that I, HANS R. SETZ, a citizen of the Republic of Switzerland, and a resident of the city of St. Louis, in the State of Missouri, United States of America, have invented certain new and useful Improvements in Pipe-Couplings, of which the following is a full, clear, and exact description, reference being had to the accompanying drawings, forming a part of this specification.

My invention relates to a pipe coupling designed more particularly for use in attaching pipes to the walls of cylinders, or other articles of manufacture, to produce absolutely efficient fluid tight joints, the coupling being one, however, that may be utilized by the employment of a suitable union member to connect the ends of two pipes.

Figure I is a vertical longitudinal section, illustrating my pipe coupling applied to the wall of an object to connect a pipe thereto. Fig. II is a cross section taken on line II—II, Fig. I.

A designates an object to which a pipe G is connected. This object is provided with a cavity B that receives a pipe and coupling members to be hereinafter described. The face of the cavity B is screw threaded throughout its outer portion, is provided at the inner end of the screw threaded portion with a straight annular face C, parallel with the surface of the screw threaded portion of the cavity, and beneath the straight annular face of the face is a downwardly and inwardly inclined annular face D that terminates at an annular base shoulder E extending inwardly from the inclined face to a bore F that registers with the channel in the pipe coupled to the part A.

The pipe G is provided at its end which is seated in the cavity B with an outwardly extending annular flange H, which seats upon the annular shoulder E at the base of said cavity, to which it is held in a manner about to be explained and leaves an annular angular groove around the flange.

1 designates a tubular screw plug, fitting around the pipe G, having a wrench head at its outer end, and the threads of which enter the internal threads of the cavity B. The screw plug is provided adjacent to its inner end with a reduced external wall 2 parallel with the axis of the plug, and movable parallel, and coöperating with the straight annular face C of the cavity B in the object A. The screw plug 1 is beveled inwardly at its inner end at 3 from the external wall 2 to the bore in the plug.

4 designates a packing of soft metal, or other suitable material, the packing being preferably of lead, and being also of a plurality of sections, as illustrated in Fig. II. This packing is made of a shape conforming to the area between the external wall of the pipe G, and the annular face C, and the opposing inclined face D of the cavity B, the flange H at the inner end of the pipe, and the inwardly beveled end of the screw plug opposing said flange, the packing having an annular flange entering the annular angular groove.

In the practical application of my pipe coupling to the object a pipe is to be connected to, the screw plug is fitted to the pipe, and the pipe is introduced into the cavity so that its flanged end will seat upon the base shoulder E at the bottom of the cavity B. The packing 4 having been inserted into the cavity around the pipe and resting against its flange, the screw plug is entered into the cavity and screwed inwardly therein to place the inner beveled end of the plug against the outer end of the packing. Further introduction of the screw plug into the cavity results in the packing being tightly forced in an inward direction against the flange of the pipe resting against the shoulder E. It will be apparent that when pressure is exerted against the packing in the manner explained, the packing is compressed; and, during its compression, the packing is directed inwardly toward the wall of the pipe to become wedged between the pipe and the inclined face D, with the result of furnishing an effective fluid tight joint; and, also, with the result of binding the flange at the end of the pipe so that there is no possibility of the pipe moving endwise, such as would be the case in the absence of said flange being subjected to the holding influence exerted by the packing. A point of material merit in the tapering of the cavity B, by providing the inclined face D, which receives the packing of my coupling, and to which I direct attention, is that by so forming the cavity, I permit of the pipe and packing being readily withdrawn from the cavity when it is desired to withdraw these parts.

I claim:—

A coupling comprising a member having a bore and a cavity formed with an annular base shoulder surrounding the bore, an inwardly inclined plain inner face extending from the shoulder, an annular plain intermediate face extending from the inner face, and a screw threaded outer face extending from the intermediate face, having the surface of the screw threads flush, approximately, with the intermediate face, a pipe having an annular flange seating against the base shoulder, a tubular screw plug having a reduced smooth external wall at its inner end coöperating with said plain inner face, and having an inwardly recessed extremity, and a packing conforming to the chamber between the inner face and the pipe and between the annular flange and the recessed extremity.

H. R. SETZ.

In the presence of—
M. FALVEY,
E. B. LINN.